(12) United States Patent
Kim et al.

(10) Patent No.: US 10,744,535 B2
(45) Date of Patent: Aug. 18, 2020

(54) SYSTEM FOR DETECTING, REMOVING, TRANSFERRING, AND RETRIEVING INCOMPLETELY DRIED RAW MATERIAL

(71) Applicant: LG Chem, Ltd., Seoul (KR)

(72) Inventors: Hyung Sop Kim, Daejon (KR); Hyeong Woo Park, Daejeon (KR)

(73) Assignee: LG Chem, Ltd. (KR)

( * ) Notice: Subject to any disclaimer, the term of this patent is extended or adjusted under 35 U.S.C. 154(b) by 3 days.

(21) Appl. No.: 16/082,391

(22) PCT Filed: Oct. 23, 2017

(86) PCT No.: PCT/KR2017/011711
§ 371 (c)(1),
(2) Date: Sep. 5, 2018

(87) PCT Pub. No.: WO2018/084477
PCT Pub. Date: May 11, 2018

(65) Prior Publication Data
US 2019/0060958 A1 Feb. 28, 2019

(30) Foreign Application Priority Data
Nov. 2, 2016 (KR) .......................... 10-2016-0145166

(51) Int. Cl.
*B07B 13/08* (2006.01)
*B07C 5/16* (2006.01)
(Continued)

(52) U.S. Cl.
CPC .............. *B07B 13/08* (2013.01); *B07B 13/00* (2013.01); *B07B 13/16* (2013.01); *B07B 13/18* (2013.01);
(Continued)

(58) Field of Classification Search
CPC .. B07C 5/16; B07C 5/13; B07B 13/00; B07B 13/08; H04N 5/33
(Continued)

(56) References Cited

U.S. PATENT DOCUMENTS 5,304,745 A * 4/1994 Rusk ........................ B07C 5/16
177/128
7,541,557 B2 * 6/2009 Voloshyn ................ B03B 13/04
209/552

(Continued)

FOREIGN PATENT DOCUMENTS

EP 2602030 A1 6/2013
EP 2602030 B1 * 3/2015 ........... G01N 23/223
(Continued)

OTHER PUBLICATIONS

International Search Report for Application No. PCT/KR2017/011711 dated Jan. 29, 2018.
(Continued)

*Primary Examiner* — Terrell H Matthews
(74) *Attorney, Agent, or Firm* — Lerner, David, Littenberg, Krumholz & Mentlik, LLP

(57) ABSTRACT

Disclosed herein is a system for detecting, removing, transferring and recovering an incompletely dried material. The system includes a transfer device transferring the material subjected to a drying process, a load cell measuring a weight of the material transferred through the transfer device, a material receiving unit receiving the measured material from the load cell when the weight of the measured material is higher than weights of other materials or a preset reference weight, a thermal imaging camera photographing the material received by the material receiving unit, an incompletely-dried-material determining unit acquiring temperature information of the material photographed by analyzing image data photographed by the thermal imaging camera, and
(Continued)

determining whether the photographed material is an incompletely dried material based on the acquired temperature information, and an incompletely-dried-material receiving unit receiving the incompletely dried material from the material receiving unit.

7 Claims, 9 Drawing Sheets

(51) Int. Cl.
*B07B 13/00* (2006.01)
*B07C 5/34* (2006.01)
*B07B 13/16* (2006.01)
*H04N 5/33* (2006.01)
*B07B 13/18* (2006.01)
*B07C 5/36* (2006.01)
*B07C 5/344* (2006.01)

(52) U.S. Cl.
CPC .................. *B07C 5/16* (2013.01); *B07C 5/34* (2013.01); *H04N 5/33* (2013.01); *B07C 5/344* (2013.01); *B07C 5/366* (2013.01)

(58) Field of Classification Search
USPC ........................................................ 209/512
See application file for complete search history.

(56) References Cited

U.S. PATENT DOCUMENTS

| 8,636,148 B2* | 1/2014 | Harding | ................ | B07C 5/344 |
| | | | | 209/11 |
| 8,672,139 B2* | 3/2014 | Harding | ................ | B07C 5/344 |
| | | | | 209/11 |
| 2006/0175232 A1 | 8/2006 | Voloshyn et al. | | |
| 2013/0141115 A1 | 6/2013 | Bourely et al. | | |
| 2015/0352596 A1* | 12/2015 | Yamakawa | ................ | B07C 5/36 |
| | | | | 209/596 |
| 2016/0194157 A1 | 7/2016 | Senn et al. | | |

FOREIGN PATENT DOCUMENTS

| JP | H1080001100 A | 1/1996 | | |
|---|---|---|---|---|
| JP | H09225405 A | 9/1997 | | |
| JP | H10197454 A | 7/1998 | | |
| JP | 3406455 B2 | 5/2003 | | |
| JP | 2015127096 A | 7/2015 | | |
| KR | 100152960 B1 | 6/1998 | | |
| KR | 100158400 B1 | 12/1998 | | |
| KR | 20040110430 A | 12/2004 | | |
| KR | 100468630 B1 | 1/2005 | | |
| KR | 100590595 B1 | 6/2006 | | |
| KR | 100784962 B1 | 12/2007 | | |
| KR | 20130002622 A | 1/2013 | | |
| KR | 20130085651 A | 7/2013 | | |
| KR | 20150069053 A | 6/2015 | | |
| KR | 20160043259 A | 4/2016 | | |
| WO | 2008085945 A1 | 7/2008 | | |
| WO | WO-2008085945 A1 * | 7/2008 | ........... | B07C 5/3427 |

OTHER PUBLICATIONS

Extended European Search Report including Written Opinion for Application No. EP17868106.0 dated Jul. 22, 2019.

* cited by examiner

SYSTEM FOR DETECTING, REMOVING, TRANSFERRING, AND RETRIEVING INCOMPLETELY DRIED RAW MATERIAL

CROSS-REFERENCE TO RELATED APPLICATIONS

The present application is a national phase entry under 35 U.S.C. § 371 of International Application No. PCT/KR2017/011711 filed Oct. 23, 2017, which claims priority from Korean Patent Application No. 10-2016-0145166 filed Nov. 2, 2016, the disclosures of which are incorporated herein by reference.

TECHNICAL FIELD

The present invention relates to a system for detecting, removing, transferring and recovering an incompletely dried material. More particularly, the invention relates to a system for detecting, removing, transferring and recovering an incompletely dried material from a material that is subjected to a drying process, using a thermal imaging camera and a load cell.

BACKGROUND ART

In order to guarantee the quality of various materials, such as food or wood, which are subjected to a drying process, the dryness of the material that has passed through the drying process is measured and then an incompletely dried material should be detected and removed.

Conventionally, in order to remove the incompletely dried material, the following methods are principally used: the incompletely dried material is directly removed from the dried materials through a visual check, or the material passing through the drying process is photographed by a thermal imaging camera to check a color difference due to a temperature difference between the incompletely dried material and the completely dried material and thereby remove the incompletely dried material.

However, in the case of distinguishing between the incompletely dried material and the completely dried material with the naked eyes, this distinguishment depends greatly on a subjective judgment and has a high possibility that a worker makes a mistake. Thus, it is difficult to perfectly sort out the incompletely dried material. Further, in the case of distinguishing between the completely dried material and the incompletely dried material through an image process using the thermal imaging camera, it is difficult to effectively take a photograph because of non-uniform transfer speed of a transfer device. Further, it is difficult to realize technology of detecting and then removing the dried material, so that this technology may not be applied in situ.

Therefore, the present invention overcomes the problems of the related art and has proposed a system for more precisely and rapidly detecting and removing an incompletely dried material, by performing measurement in stages using a load cell and a thermal imaging camera system.

DISCLOSURE

Technical Problem

Accordingly, the present invention is intended to provide a system for detecting, removing, transferring and recovering an incompletely dried material, which allows the incompletely dried material to be precisely detected from a material passing through a drying process, and then allows the detected material to be automatically removed, transferred and recovered.

Technical Solution

In order to accomplish the above object, the present invention provides a system for detecting, removing, transferring and recovering an incompletely dried material from a material subjected to a drying process, the system including:

a transfer device transferring the material subjected to the drying process;

a load cell measuring a weight of the material transferred through the transfer device;

a material receiving unit receiving the measured material from the load cell when the weight of the measured material is higher than weights of other materials or a preset reference weight;

a thermal imaging camera photographing the material received by the material receiving unit;

an incompletely-dried-material determining unit acquiring temperature information of the material photographed by analyzing image data photographed by the thermal imaging camera, and determining whether the photographed material is an incompletely dried material based on the acquired temperature information; and an incompletely-dried-material receiving unit receiving the material, determined as the incompletely dried material by the incompletely-dried-material determining unit from the material receiving unit.

The system may further include a completely-dried-material transfer line receiving the measured material from the load cell when the weight of the material measured by the load cell is not higher than weights of other materials or a preset reference weight; and a completely-dried-material delivering unit delivering the completely dried material from the material receiving unit to the completely-dried-material transfer line, when it is determined by the incompletely-dried-material determining unit that the material photographed by the thermal imaging camera is the completely dried material.

The completely-dried-material delivering unit may be a plate-shaped arm reciprocating from one side to the other side above the material receiving unit so as to drop the completely dried material placed on the material receiving unit to the completely-dried-material transfer line located underneath the material receiving unit.

The material receiving unit may have a plurality of material receiving plates that may be rotatable about respective rotation axes between an open position and a closure position and may be arranged in series, and any one of the plurality of material receiving plates may be disposed underneath the load cell to be located at a position for receiving a material dropped from the load cell.

when the material receiving plate may be in the open position, the material dropped from the load cell may pass through the material receiving unit and then may be delivered to the completely-dried-material transfer line.

The system may further include an operation control unit independently rotating each of the material receiving plates to the open or closure position, the operation control unit rotates the material receiving plate, located at the receiving position from the open position to the closure position, to receive the material dropped from the load cell when the weight of the material measured by the load cell is higher than weights of other materials or a preset reference weight.

When the material receiving plate may receive the material from the load cell at the receiving position, the operation control unit may sequentially move the respective material receiving plates of the material receiving unit towards the thermal imaging camera.

The system may further include a recovery delivering unit delivering a material determined as the incompletely dried material by the incompletely-dried-material determining unit to the drying process.

Advantageous Effects

A system for detecting, removing, transferring and recovering an incompletely dried material of the present invention allows the incompletely dried material to be precisely detected from a material passing through a drying process. Further, the system of the invention allows the detected incompletely dried material to be automatically removed, transferred and recovered.

BEST MODE

Exemplary embodiments of the present invention will be described below in more detail with reference to the accompanying drawings. However, the present invention may be changed in various forms without being limited to these embodiments.

Herein, the term "completely dried material (DM)" means a material that has little solvent therein after a material containing the solvent is dried, the term "incompletely dried material" means a material in which some or all of the solvent remains, and the term "estimated incompletely dried material (ENDM) means a material that is estimated that some or all of the solvent will remain therein. The solvent means a solvent including, but not limited to, water, oil or acetone.

The present invention provides a system for detecting, removing, transferring and recovering an incompletely dried material from a material that is subjected to a drying process, the system including:

a transfer device transferring the material that is subjected to the drying process;

a load cell measuring a weight of the material transferred through the transfer device;

a material receiving unit receiving the measured material from the load cell when the weight of the measured material is higher than weights of other materials or a preset reference weight;

a thermal imaging camera photographing the material received by the material receiving unit;

an incompletely-dried-material determining unit acquiring temperature information of the photographed material by analyzing image data photographed by the thermal imaging camera, and determining whether the photographed material is an incompletely dried material based on the acquired temperature information; and an incompletely-dried-material receiving unit receiving the material, determined as the incompletely dried material by the incompletely-dried-material determining unit, from the material receiving unit.

Figure 1:
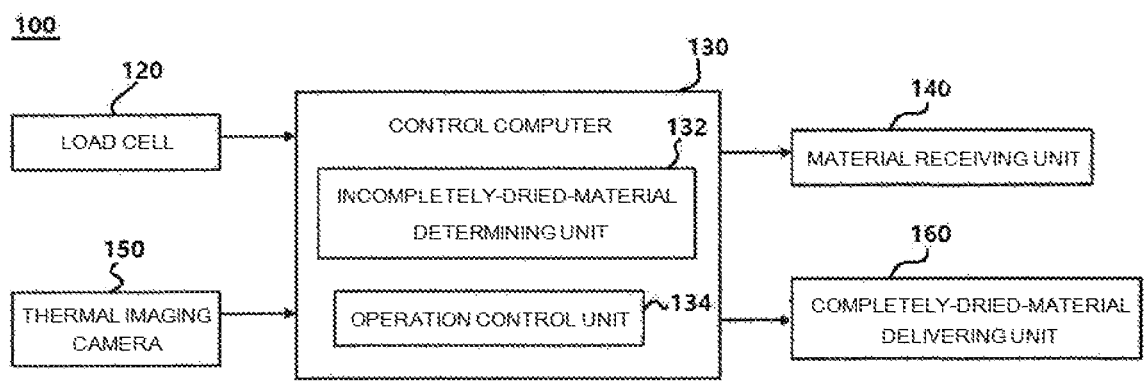
FIG. 1 is a block diagram showing a configuration of a system for detecting, removing, transferring and recovering an incompletely dried material according to an embodiment of the present invention.
Figure 2:
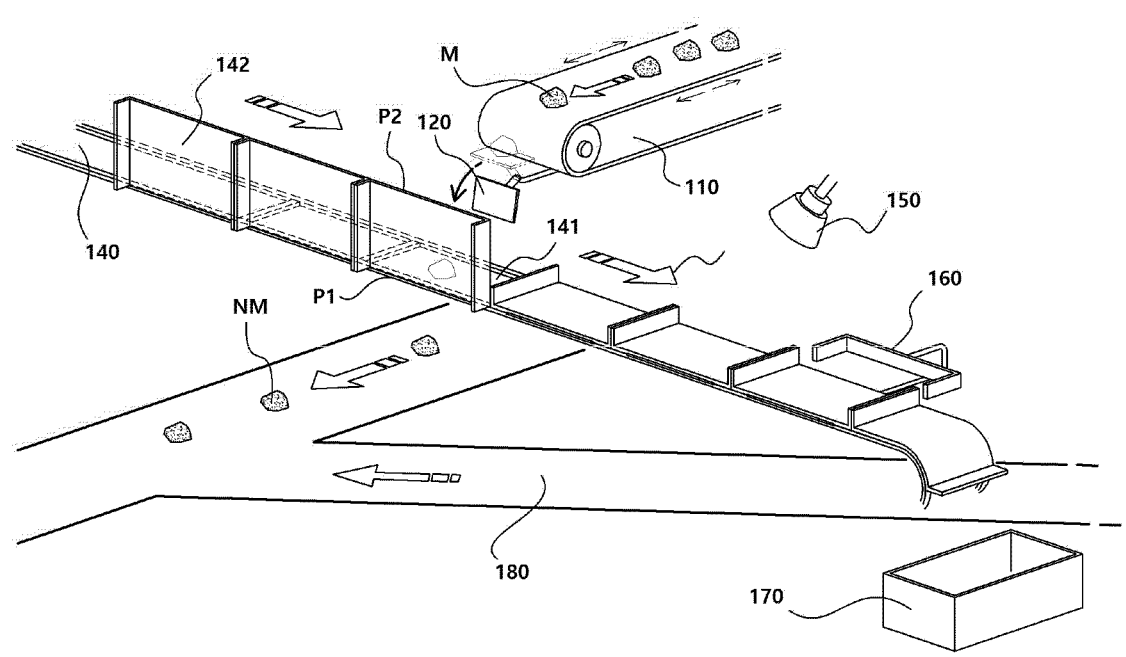
FIGS. 2 to 5 are reference drawings describing an operation of the system for detecting, removing, transferring and recovering the incompletely dried material according to the embodiment of the present invention.
Figure 3:
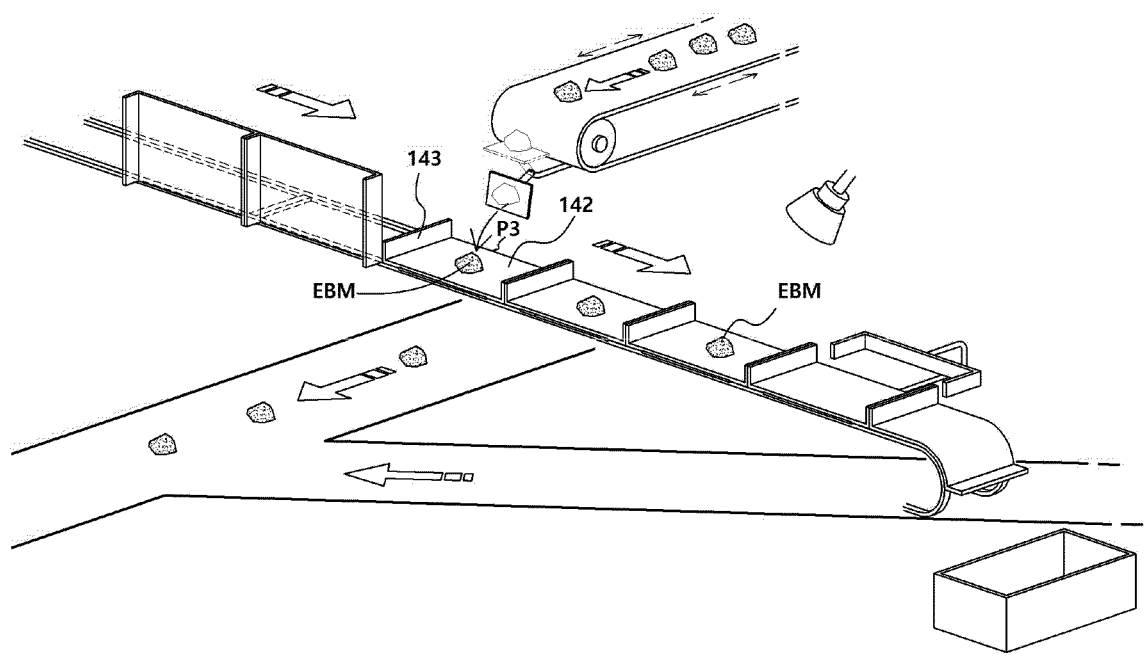
Figure 4:
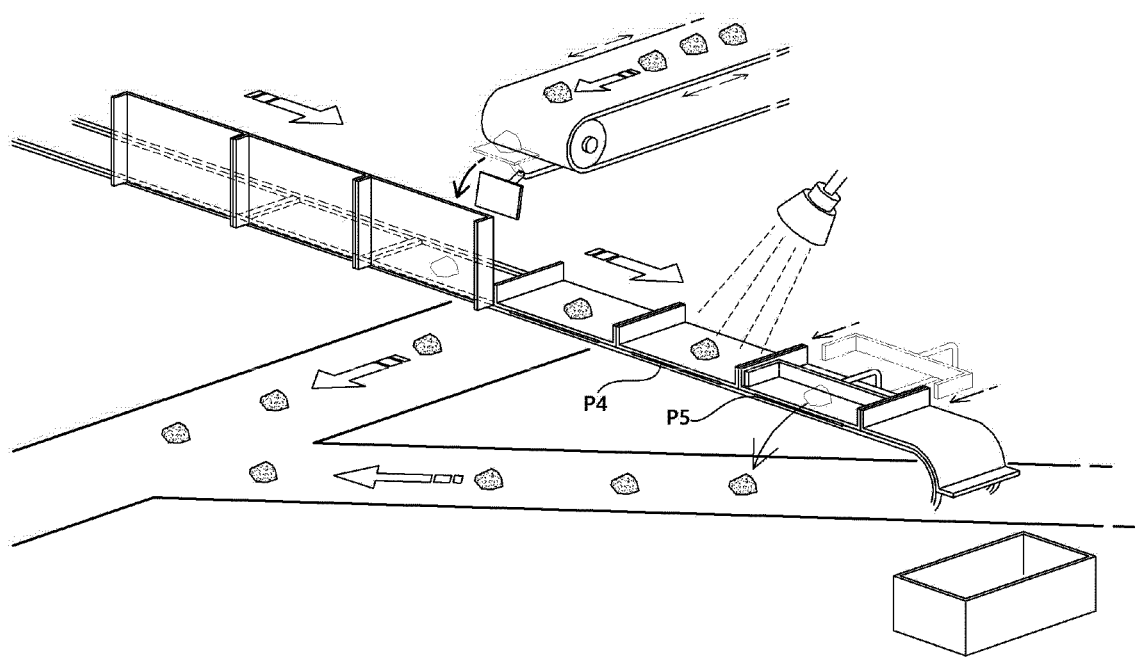
Figure 5:
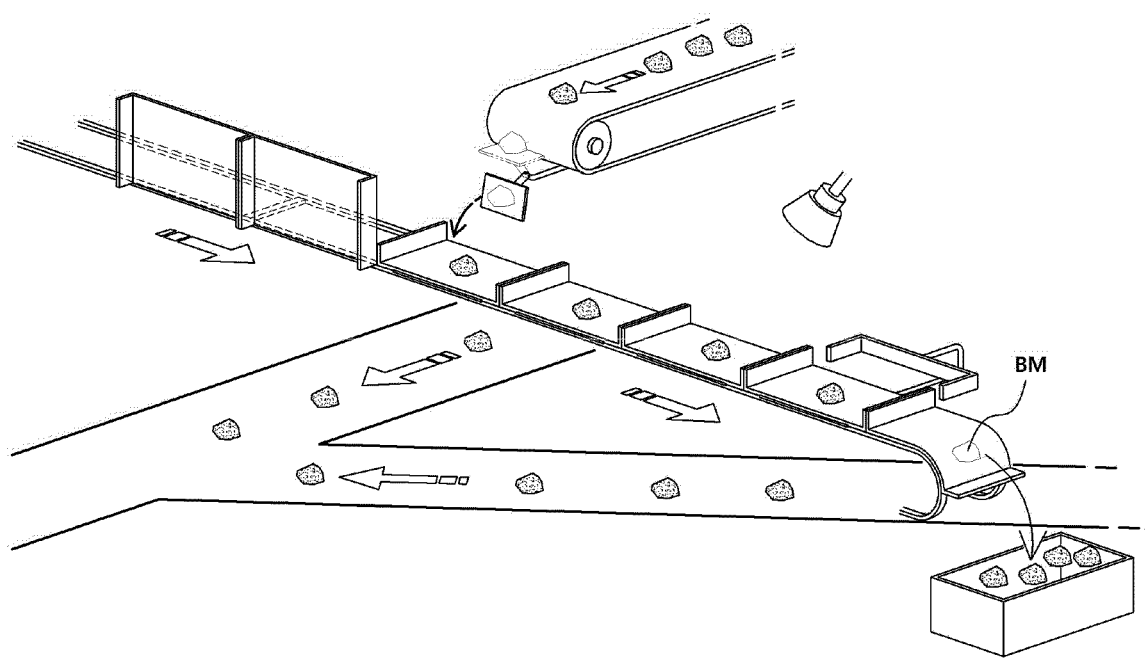

FIG. 1 is a block diagram showing a configuration of a system for detecting, removing, transferring and recovering an incompletely dried material according to an embodiment of the present invention, and FIGS. 2 to 5 are reference drawings describing an operation of the system for detecting, removing, transferring and recovering the incompletely dried material according to the embodiment of the present invention.

Referring to FIGS. 1 to 5, a system 100 for detecting, removing, transferring and recovering an incompletely dried material according to the embodiment of the present invention includes a transfer device 110, a load cell 120, a control computer 130 that controls an entire operation of the system 100, a material receiving unit 140 that receives a material from the load cell 120 when the weight of the material measured by the load cell 120 meets a predetermined condition, a completely-dried-material transfer line 180 transferring a material that is determined as being completely dried, a thermal imaging camera 150 that photographs a material on the material receiving unit 140, a completely-dried-material delivering unit 160 that delivers a completely dried material (DM) to the completely-dried-material transfer line 180 when the material of the material receiving unit 140 is the completely dried material (DM), and an incompletely-dried-material receiving unit 170 that receives an incompletely dried material (NDM) from the material receiving unit 140 when the material of the material receiving unit 140 is the incompletely dried material (NDM).

The transfer device 110 receives the material that is subjected to the drying process and then transfers the material in a preset transfer direction. The transfer device 110 is preferably a vibrating-type transfer device, that is, moves only the material that is on the transfer device 110 in a predetermined direction by the to-and-from reciprocating vibration of the transfer device 110 itself. However, without being limited thereto, the transfer device may adopt a different method for transferring the material, for example, may be implemented as a conveyor belt.

The load cell 120 is installed at an end area in a transfer direction of the transfer device 110 to measure the weight of the material transferred from the transfer device 110. The load cell 120 transmits weight data measured in real time to the incompletely-dried-material determining unit 132 of the control computer 130.

The control computer 130 determines whether the material is incompletely dried based on the weight data of the material transmitted from the load cell 120. A material having a high weight that is out of range for weights of other materials continuously measured is determined as an estimated incompletely dried material (ENDM), and the remaining materials are determined as the completely dried material (DM). For example, the material having a high weight that is out of range for the weights means a material having a considerably higher weight than a maximum value of the weights of the materials measured by the load cell 120. In this manner, the material may be determined as the estimated incompletely dried material (ENDM). Alternatively, by comparing the weight data of the measured material with weight data of a normal range that is previously retained in the control computer 130, it is possible to determine whether the material is defective. Therefore, the control computer 130 includes an operation control unit 134 that controls an operation of the material receiving unit 140 according to the result determined of the incompletely-dried-material determining unit 132.

Generally, since the incompletely dried material (NDM) is heavier in weight than the completely dried material (DM) due to a solvent content, it is possible to determine whether the material is dried by measuring the weight using the load cell 120.

The material receiving unit 140 receives the material from the load cell 120 when it is determined by the incompletely-dried-material determining unit 132 that the material measured by the load cell 120 is the estimated incompletely dried material (ENDM).

The material receiving unit 140 may be configured such that a plurality of material receiving plates 142 that are rotatable about respective rotation axes are arranged in series. The material receiving plates 142 of the material receiving unit 140 may be simultaneously moved in a preset direction.

The thermal imaging camera 150 is installed above the material receiving unit 140 to photograph the estimated incompletely dried material (ENDM) transferred through the material receiving unit 140. The thermal imaging camera 150 transmits the photographed image data to the incompletely-dried-material determining unit 132 of the control computer 130.

The incompletely-dried-material determining unit 132 may determine a color proportion of the photographed image by analyzing image data and then determine the temperature of the material using the determined color proportion. The color proportion may be attained by analyzing RGB data of each pixel of the photographed image data.

Figure 9:
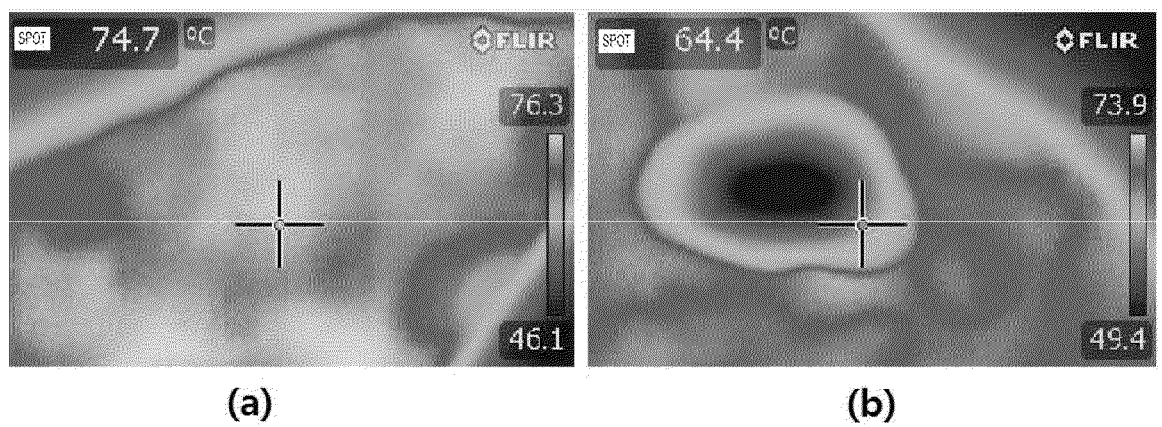
FIG. 9 is a drawing showing an exemplary image of a material photographed by a thermal imaging camera.

Generally, the incompletely dried material (NDM) has a lower temperature than the completely dried material (DM) because undergo evaporation by containing of the solvent. The image photographed by the thermal imaging camera 150 is expressed by different colors depending on the surface temperature of a subject to be photographed. FIG. 9A shows an image of the completely dried material (DM) photographed by the thermal imaging camera, and FIG. 9B shows an image of the incompletely dried material (NDM) photographed by the thermal imaging camera. In the case of the completely dried material (DM), it can be seen that the entire material has a red color indicating a relatively high temperature. In contrast, in the case of the incompletely dried material (NDM), it can be seen that the material has a blue color indicating a low temperature at a set region because it contains the solvent therein. Therefore, it is possible to check the surface temperature of the material by analyzing the image photographed by the thermal imaging camera 150, and to determine whether the material is dried by measuring the surface temperature of the analyzed material. For example, when a particular color proportion corresponding to a particular temperature is higher than proportion be set in colors constituting an entire image, a correspond material may be determined as the incompletely dried material (NDM). The preset proportion and the particular temperature may be changed depending on the kind of the material and the process temperature.

The completely-dried-material delivering unit 160 removes the material from the material receiving unit 140 and then delivers it to the completely-dried-material transfer line 180, if the material photographed by the thermal imaging camera 150 is determined by the incompletely-dried-material determining unit 132 to be the completely dried material (DM).

The completely-dried-material delivering unit 160 may transfer or drop the completely dried material (DM) placed on the material receiving unit 140 to the completely-dried-material transfer line 180 placed underneath the material receiving unit 140, using a device, to may deliver the material to the completely-dried-material transfer line 180. To this end, the completely-dried-material delivering unit 160 may be implemented in the form of a plate-shaped arm reciprocating from one side to the other side above the material receiving unit 140, and may have a "⊂" shape to precisely transfer the material to a desired place.

The incompletely-dried-material receiving unit 170 receives the incompletely dried material (NDM) from the material receiving unit 140 when the material photographed by the thermal imaging camera is determined to be the incompletely dried material (NDM). The incompletely-dried-material receiving unit 170 may be implemented as a basket, a container or the like.

Hereinafter, the operation of the system for detecting, removing, transferring and recovering the incompletely dried material according to the embodiment of the present invention will be described in detail with reference to FIGS. 2 to 5.

First, any one of the material receiving plates 142 of the material receiving unit 140 is located at a receiving position P1 for receiving the material dropped from the load cell 120. Here, the material receiving plate 142 is located at an open position P2 where an opening part 141 of the material receiving unit 140 is not closed. When the material receiving plate 142 is located at the open position P2, the completely dried material (DM) dropped from the load cell 120 passes through the opening part 141 and then is dropped and delivered to the completely-dried-material transfer line 180.

The material passing through the drying process is transferred along the transfer device 110 to be located at the load cell 120. The load cell 120 measures the weight of the transferred material and transmits the measured data to the incompletely-dried-material determining unit 132. Subsequently, the load cell 120 drops the material downwards after the lapse of a predetermined period. The period may be from 0.01 to 3 seconds, but is not limited thereto.

Further, when the weight of the material measured by the load cell 120 is within the range of weights of other materials or is lower than a preset reference weight, the operation control unit 134 controls the material receiving unit 140 such that the material receiving plate 142 is located at the open position P2. Thus, the material dropped from the load cell 120 passes through the opening part 141 and then is delivered to the completely-dried-material transfer line 180.

If the weight of the material measured by the load cell 120 is higher than weights of other materials or a preset reference weight, the operation control unit 134 controls the material receiving unit 140 such that the material receiving plate 142 is shifted from the open position P2 to the closure position P3. As the material receiving plate 142 is located at the closure position P3, the opening part 141 is closed and thus the material dropped from the load cell 120 is seated on an upper surface of the material receiving plate 142. Wings 143 are provided on both opposing sides of the material receiving plate 142 to protrude upwards, thus allowing the material dropped from the load cell 120 to be stably seated without deviating from the upper surface of the material receiving plate 142.

If the material is seated on the material receiving plate 142, the operation control unit 134 moves the material receiving plates 142 of the material receiving unit 140 in a transfer direction D1. By such a movement, a new material receiving plate 142 is shifted from the open position P2 to the receiving position P1. The material receiving plate 142 receives the material and then moves in a photographing direction of the thermal imaging camera 150.

The material receiving operation of the material receiving plate 142 and the moving operation of the material receiving plate are repeatedly performed. If the material receiving plate 142 receiving the material is sequentially moved in the moving direction D1 by the repeated operations to be located at a photographing position P4 of the thermal imaging camera 150, the thermal imaging camera 150 photographs the estimated incompletely dried material (ENDM).

The incompletely-dried-material determining unit 132 determines whether the material photographed as described above is the incompletely dried material (NDM), using image data photographed by the thermal imaging camera 150.

When the incompletely-dried-material determining unit 132 determines that the photographed material is the completely dried material (DM), if the material receiving plate 142 is located at a delivery position P5, the completely-dried-material delivering unit 160 removes the completely dried material (DM) placed on the material receiving plate 142 from the material receiving plate 142 and then delivers it to the completely-dried-material transfer line 180.

In contrast, when the incompletely-dried-material determining unit 132 determines that the photographed material is the incompletely dried material (NDM), the incompletely dried material (NDM) located at the material receiving plate 142 is dropped into the incompletely-dried-material receiving unit 170 at a drop position P5.

Further, the system for detecting, removing, transferring and recovering the incompletely dried material of the present invention may further include a recovery delivering unit delivering the incompletely dried material from the incompletely-dried-material receiving unit to the drying process.

For example, the recovery delivering unit delivers the incompletely dried material (NDM) to a start stage of the drying process so as to make the completely dried material (DM) from the material which is finally determined as the incompletely dried material (NDM) and is transferred to the incompletely-dried-material receiving unit 170, through the drying process.

The system 100 for detecting, removing, transferring and recovering the incompletely dried material according to the embodiment of the present invention primarily selects the estimated incompletely dried material (ENDM) from the material passing through the drying process, using the load cell, and then determines the degree of dryness of the selected material using the thermal imaging camera, thus selecting the incompletely dried material (NDM) and thereby improving the accuracy of selecting the incompletely dried material (NDM).

Further, since the system 100 for detecting, removing, transferring and recovering the incompletely dried material according to the embodiment of the present invention may precisely sort out only the incompletely dried material (NDM), it is possible to reduce the unnecessary loss of the material.

Figure 6:
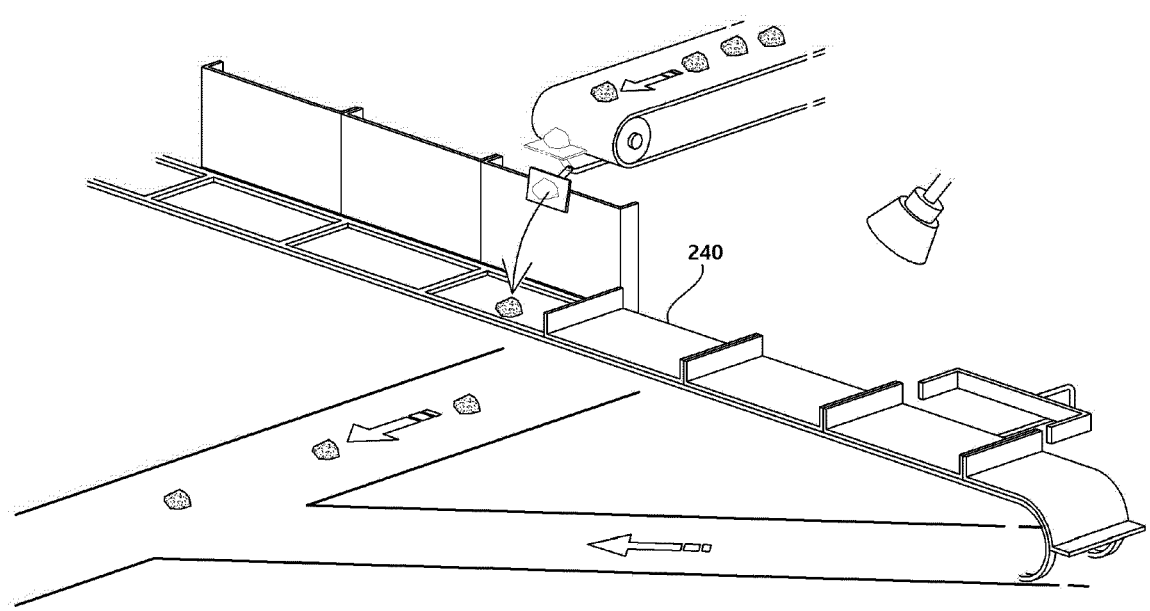
FIGS. 6 and 7 are reference drawings describing an operation of a system for detecting, removing, transferring and recovering an incompletely dried material according to another embodiment of the present invention.
Figure 7:
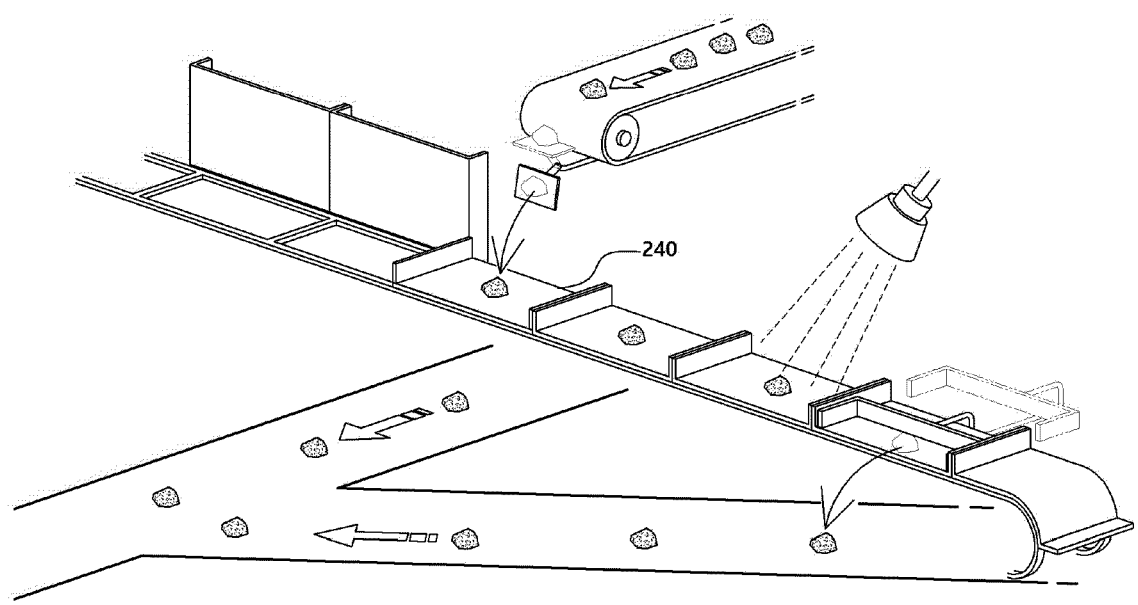

FIGS. 6 and 7 are reference drawings describing an operation of a system for detecting, removing, transferring and recovering an incompletely dried material according to another embodiment of the present invention. The system for detecting, removing, transferring and recovering the incompletely dried material of FIGS. 6 and 7 remains the same as the system for detecting, removing, transferring and recovering the incompletely dried material of FIGS. 2 to 5 except for the direction of a rotation axis of the material receiving unit 240. Reference numerals and detailed description for components that are equal to those of FIGS. 2 to 5 will be omitted herein.

Figure 8:
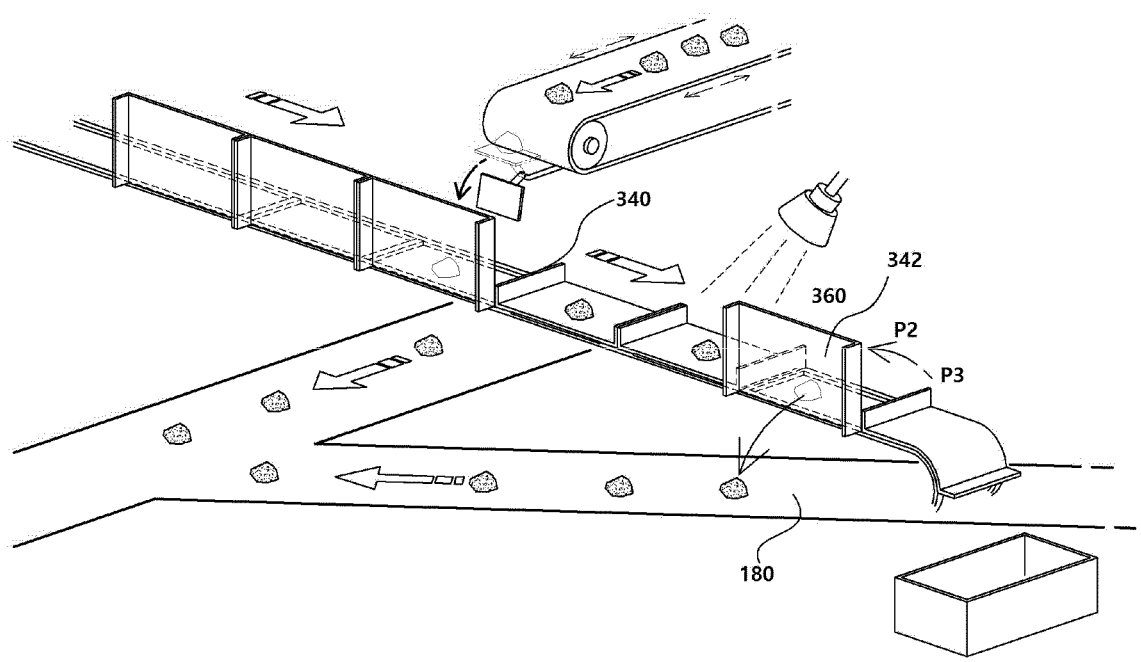
FIG. 8 is a reference drawing describing an operation of a system for detecting, removing, transferring and recovering an incompletely dried material according to a further embodiment of the present invention.

FIG. 8 is a reference drawing describing an operation of a system for detecting, removing, transferring and recovering an incompletely dried material according to a further embodiment of the present invention. The system for detecting, removing, transferring and recovering the incompletely dried material of FIG. 8 remains the same as the system for detecting, removing, transferring and recovering the incompletely dried material of FIGS. 2 to 5 except for the configuration and operation of a completely-dried-material delivering unit 360. Reference numerals and detailed description for components that are equal to those of FIGS. 2 to 5 will be omitted herein.

The system 100 for detecting, removing, transferring and recovering the incompletely dried material of FIG. 8 is configured such that the completely-dried-material delivering unit 360 is not implemented as a separate component as illustrated in FIGS. 2 to 5, that is implemented using the material receiving plate 342 of the material receiving unit 340 which is rotatable about the rotation axis between the open position and the closure position.

If the material located at the material receiving plate 342 is the completely dried material (DM), the operation control unit 134 rotates the material receiving plate 342 from the closure position P3 to the open position P2, so that the completely dried material (DM) located above the material receiving plate 342 is dropped to the completely-dried-material transfer line 180.

The system for detecting, removing, transferring and recovering the incompletely dried material according to a further embodiment of the present invention is configured such that the completely-dried-material delivering unit 360 is not implemented as a separate component, that is implemented using the material receiving plate 342 of the material receiving unit 340. Consequently, the system for detecting, removing, transferring and recovering the incompletely dried material has a effect that structure be simpled and reduces a manufacturing cost.

DESCRIPTION OF REFERENCE NUMERAL OF IMPORTANT PARTS

100: system for detecting, removing, transferring and recovering incompletely dried material
110: transfer device
120: load cell
130: control computer
132: incompletely-dried-material determining unit
134: operation control unit
140: material receiving unit -continued

| | |
|---|---|
| 150: thermal imaging camera | 160: completely-dried-material delivering unit |
| 170: incompletely-dried-material receiving unit | |
| 180: completely-dried-material transfer line | |

The invention claimed is:

1. A system for detecting, removing, transferring and recovering an incompletely dried material from a material subjected to a drying process comprising:
   a transfer device transferring the material subjected to the drying process;
   a load cell measuring a weight of the material transferred through the transfer device;
   a material receiving unit receiving the measured material from the load cell when the weight of the measured material is higher than weights of other materials or a preset reference weight;
   a thermal imaging camera photographing the material received by the material receiving unit;
   an incompletely-dried-material determining unit acquiring temperature information of the material photographed by analyzing image data photographed by the thermal imaging camera, and determining whether the photographed material is an incompletely dried material based on the acquired temperature information; and
   an incompletely-dried-material receiving unit receiving the material determined as the incompletely dried material by the incompletely-dried-material determining unit from the material receiving unit,
   wherein the material receiving unit comprises a plurality of material receiving plates that are rotatable about respective rotation axes between an open position and a closure position and are arranged in series, and any one of the plurality of material receiving plates is disposed underneath the load cell to be located at a position for receiving a material dropped from the load cell.

2. The system for detecting, removing, transferring and recovering an incompletely dried material of claim 1, further comprising:
   a completely-dried-material transfer line receiving the measured material from the load cell when the weight of the material measured by the load cell is not higher than weights of other materials or a preset reference weight; and
   a completely-dried-material delivering unit delivering the completely dried material from the material receiving unit to the completely-dried-material transfer line, when it is determined by the incompletely-dried-material determining unit that the material photographed by the thermal imaging camera is the completely dried material.

3. The system for detecting, removing, transferring and recovering an incompletely dried material of claim 2, wherein the completely-dried-material delivering unit is a plate-shaped arm reciprocating from one side to the other side above the material receiving unit so as to drop the completely dried material placed on the material receiving unit to the completely-dried-material transfer line located underneath the material receiving unit.

4. The system for detecting, removing, transferring and recovering an incompletely dried material of claim 1, wherein, when the material receiving plate is in the open position, the material dropped from the load cell passes through the material receiving unit and then is delivered to the completely-dried-material transfer line.

5. The system for detecting, removing, transferring and recovering an incompletely dried material of claim 1, further comprising an operation control unit independently rotating each of the material receiving plates to the open or closure position,
   the operation control unit rotates the material receiving plate located at the receiving position from the open position to he closure position, to receive the material dropped from the load cell when the weight of the material measured by the load cell is higher than weights of other materials or a preset reference weight.

6. The system for detecting, removing, transferring and recovering an incompletely dried material of claim 5, wherein, when the material receiving plate receives the material from the load cell at the receiving position, the operation control unit sequentially moves the respective material receiving plates of the material receiving unit towards the thermal imaging camera.

7. The system for detecting, removing, transferring and recovering an incompletely dried material of claim 1, further comprising a recovery delivering unit delivering a material determined as the incompletely dried material by the incompletely-dried-material determining unit to the drying process.

* * * * *